(12) United States Patent
Raanan et al.

(10) Patent No.: US 7,672,814 B1
(45) Date of Patent: Mar. 2, 2010

(54) SYSTEM AND METHOD FOR BASELINE THRESHOLD MONITORING

(75) Inventors: Gili Raanan, Cupertino, CA (US); Tom Tsarfati, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 54 days.

(21) Appl. No.: 11/152,821

(22) Filed: Jun. 13, 2005

Related U.S. Application Data

(63) Continuation-in-part of application No. 10/792,649, filed on Mar. 3, 2004, now Pat. No. 7,590,715.

(51) Int. Cl.
*G06F 3/00* (2006.01)
(52) U.S. Cl. .................. 702/193; 702/182; 702/189; 702/194
(58) Field of Classification Search .......... 702/71, 702/183, 185, 186, 188, 193, 198, 182, 189, 702/194; 370/252, 352; 703/2; 709/224
See application file for complete search history.

(56) References Cited

U.S. PATENT DOCUMENTS

| | | | |
|---|---|---|---|
| 6,643,613 B2 * | 11/2003 | McGee et al. ............... 702/186 |
| 6,643,614 B2 * | 11/2003 | Ding et al. .................. 702/186 |
| 6,801,940 B1 * | 10/2004 | Moran et al. ................ 709/224 |
| 6,816,798 B2 * | 11/2004 | Pena-Nieves et al. ......... 702/84 |
| 2002/0133320 A1 * | 9/2002 | Wegerich et al. ............... 703/2 |
| 2003/0144746 A1 | 7/2003 | Hsiung |
| 2003/0195861 A1 | 10/2003 | McClure |

* cited by examiner

*Primary Examiner*—Hal D Wachsman
*Assistant Examiner*—Felix E Suarez
(74) *Attorney, Agent, or Firm*—Krishnendu Gupta; Joseph D'Angelo

(57) ABSTRACT

The present invention provides a system for identifying exceptional behavior of a hardware or software component. According to one embodiment, the system comprises an operational metric calculator that is operative to sample a first behavior of an operational metric and a second behavior of the operational metric. The operational metric may be any metric that quantifies the operation of a hardware or software component, as well as combinations thereof. A baseline threshold calculator is operative to calculate a baseline threshold on the basis of the first sampled behavior of the operational metric. The baseline threshold is applied by a baseline threshold analyzer to the second operational metric to generate an alarm when the second sampled behavior of the operational metric deviates from the baseline threshold.

16 Claims, 5 Drawing Sheets

SYSTEM AND METHOD FOR BASELINE THRESHOLD MONITORING

This application is a Continuation-in-Part of application Ser. No. 10/792,649, entitled "METHOD AND SYSTEM FOR AUTOMATIC CLASSIFICATION OF APPLICATIONS AND SERVICES BY PACKET INSPECTION," filed Mar. 3, 2004 now U.S. Pat. No. 7,590,715, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to monitoring systems for hardware and software. More specifically, the present invention relates to modeling a baseline behavior of a hardware or software component, which is applied to an observed operational metric representing the hardware or software component's interaction with other software, hardware or human entities, to determine abnormal operation of the hardware or software component.

Currently, systems exist that monitor an operational metric and generate alarms whenever a given operational metric approaches, reaches or exceeds a pre-determined threshold. This technique involves a monitoring system or agent taking a sample of the monitored metric during a sampling interval and comparing the sampled value for the monitored metric against a static threshold value that is set by a user, such as an administrator. Whenever the monitored metric approaches, reaches or exceeds the static threshold value, an alarm is generated. Setting static thresholds, however, relies on the assumption that the user is capable of accurately defining upper and lower thresholds that signify the existence of unacceptable operational metrics or other exceptional conditions. The ability of the user to accurately and properly define thresholds directly affects the accuracy of a monitoring system, e.g., by generating false alarms.

In situations where a monitored metric has no obvious absolute maximum or minimum value, a user is unable to define percentage-based thresholds. For example, the user cannot define a threshold such as "ninety percent of the transactions that a web server performs". A threshold such as this fails to be meaningful due to the fact that there is no obvious or meaningful absolute maximum (or minimum) for the total number of transactions that a web server may perform. Furthermore, defining a single static threshold may be insufficient to accurately signify the existence of an unacceptable or otherwise exceptional situation. Situations exist in which a monitored operational metric is below a threshold, but still signifies the existence of an unacceptable or otherwise exceptional situation, e.g., because the value of the operational metric is unexpected at a given time of day, day of the week, etc. This unexpected value may, for example, signify a problem or misuse of the hardware or software component from which the operational metric was sampled.

Therefore, systems and methods are needed that generate indicia of the behavior of a given hardware or software component to identify expected operational behavior of the component, which may be used to monitor for behavior that deviates from the expected operation of the component.

SUMMARY OF THE INVENTION

The present invention provides systems and methods for generating a baseline threshold that indicates an expected performance of a hardware or software component, which may be applied to one or more sampled operational metrics of the hardware or software device to determine exceptional behavior. According to one embodiment, a system is provided for identifying exceptional behavior of a hardware or software component that comprises an operational metric calculator, a baseline threshold calculator and a baseline threshold analyzer.

The present invention samples or monitors one or more operational metrics of a given hardware or software component to identify behavior that is unacceptable or otherwise exceptional. Operational metrics generally quantify a behavior of a given hardware or software component's interactions with other systems and users. Behaviors quantified by an operational metric may include, but are not limited to:
- Verb/Action—The action contained in a packet. This may be "PUT" or "GET" for an HTTP communication, or "Read," "Write," or "Delete" for SQL communication;
- Error messages;
- Users—user Ids in a packet;
- Objects—Objects in the packet, for example, files, URLs, or database tables; and
- Network Segments—The network segments in the packet.

Furthermore, an given operational metric may comprise an aggregation of one or more other operational metrics over a unit of time, which may include, but is not limited to, the number of transactions per unit of time, transaction types, bandwidth consumption, applications involved in a request or response, etc.

The operational metric calculator is operative to sample a first behavior of an operational metric and a second behavior of the operational metric of a given hardware or software component. A baseline threshold calculator is operative to calculate a baseline threshold on the basis of the first sampled behavior of the operational metric, which the baseline threshold analyzer may apply to the second sampled behavior of the operational metric and generate an alarm when the second sampled behavior of the operational metric deviates from the baseline threshold.

The system may sample the behavior of one or more operational metrics for one or more hardware or software components in a network and generate a baseline threshold for each operational metric to thereby determine if the behaviors of the operational metrics of the hardware and software devices are deviating from expected behaviors. Furthermore, the baseline threshold calculator may calculate multiple baseline thresholds for a given operational metric of a given hardware or software component. According to one embodiment, different baseline thresholds may be calculated for an operational metric according to different times of the day, days of the week, months of the year, etc.

A deviation may be set by the baseline threshold analyzer, which may be set by a user operating the baseline threshold analyzer, to identify a deviation from the baseline threshold. The baseline threshold analyzer generates an alarm when the second sampled behavior of the operational metric lies outside the deviation of the baseline threshold. The deviation may be a static value, e.g., a static deviation from a baseline threshold, or may be a relative value, e.g., a percentage of a baseline threshold.

The present invention also contemplates a method for identifying exceptional behavior of a hardware or software component. The method comprises sampling a first behavior of an operational metric of a hardware or software component, calculating a baseline threshold on the basis of the first sampled behavior of the operational metric, sampling a second behavior of the operational metric of the hardware or software component, applying the baseline threshold to the second sampled behavior of the operational metric and generating an alarm when the second sampled behavior of the operational metric deviates from the baseline threshold.

The method may include sampling a behavior for one or more operational metrics for one or more hardware or software components in a network, generating a baseline threshold for each operational metric and determining if the behaviors of the operational metrics of the hardware and software devices are deviating from expected behaviors. Furthermore, multiple baseline thresholds may be calculated for a given operational metric of a given hardware or software component. According to one embodiment, the method comprises calculating a different baseline threshold for an operational metric according to different times of the day, days of the week, months of the year, etc.

The method may also comprise setting a deviation to identify a deviation from the baseline threshold. An alarm is generated when the second sampled behavior of the operational metric lies outside the deviation of the baseline threshold. The deviation may be a static value, e.g., a static deviation from a baseline threshold, or may be a relative value, e.g., a percentage of a baseline threshold.

DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
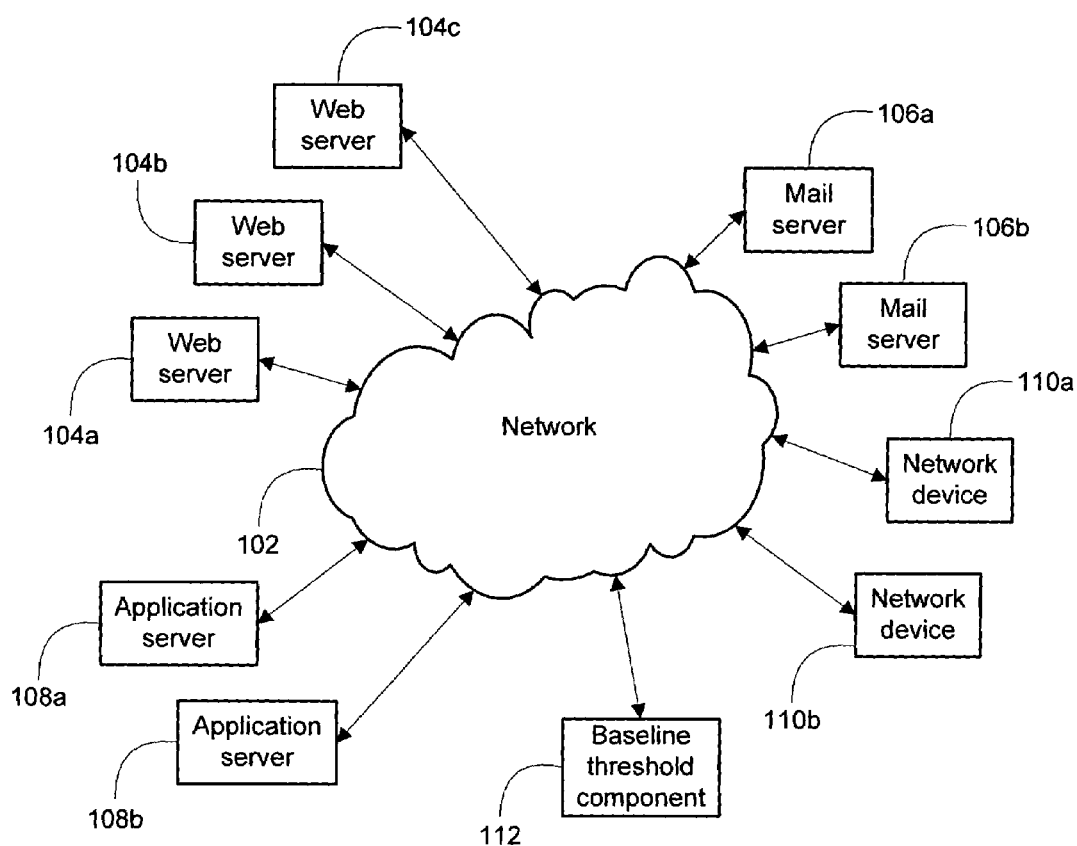
FIG. 1 is a block diagram illustrating a monitoring system for baseline threshold monitoring in a computer network according to one embodiment of the present invention.

With reference to FIGS. 1 through 4, embodiments of systems and methods according to the present invention are presented. Referring to FIG. 1, a computer network 102 provides a communication medium 102 for hardware devices and software applications, e.g., servers. The network 102 may be a single local area network, a number of interconnected local area networks, wide area networks, such as the Internet, or other networks that provide one or more communication paths for hardware and software components as is known to those of skill in the art.

According to the embodiment of FIG. 1, several web servers 104a, 104b and 104c are coupled to the network 102. The web servers 104a, 104b and 104c provide data, such as HTML web pages in response to client requests or on an automated basis. Serving web pages is an exemplary operational metric of the web servers 104a, 104b and 104c. Mail servers 106a and 106b are also coupled to the network 102, each operative to receive and send electronic mail. The number of send and receive transactions that a mail server processes is an exemplary operation metric of the mail servers 106a and 106b. Application servers 108a and 108b in communication with the network provide any number of applications to clients, e.g., applications exposed to clients over a network as a set of web services. The number of connections to an application server is an exemplary operational metric of the application servers 108a and 108b. Other components 110a and 110b are in communication with and comprise the network 102, each of which comprise operational metrics, e.g., a quantifiable description of a given aspect of a given component 110a and 100b.

The hardware and software components 104a, 104b, 104c, 106a, 106b, 108a, 108b, 110a and 110b are in communication with a baseline threshold component 112 over the network 102. The baseline threshold component 112, which may be embodied in various combinations of hardware and software, is programmed to sample information regarding the operational metrics of the hardware and software components 104a, 104b, 104c, 106a, 106b, 108a, 108b, 110a and 110b that are in communication over the network 102. The baseline threshold component comprises persistent storage to maintain the sampled operational metrics. The baseline threshold component 112 uses the sampled operational metrics to generate a baseline threshold for each device from which it receives sample operational metrics. The process of generating baseline thresholds is described in greater detail herein. As is also described in greater detail herein, the baseline threshold component 112 uses to a baseline threshold in conjunction with the sampled operational metrics to determine if a given hardware or software component is operating in a manner that is unacceptable or otherwise exceptional, which may include operating above or below the expected behavior as indicated by the baseline threshold. When an operational metric approaches, reaches or exceeds the baseline threshold, and alarm may be generated to alert a user, such as an administrator, of the situation.

Figure 2:
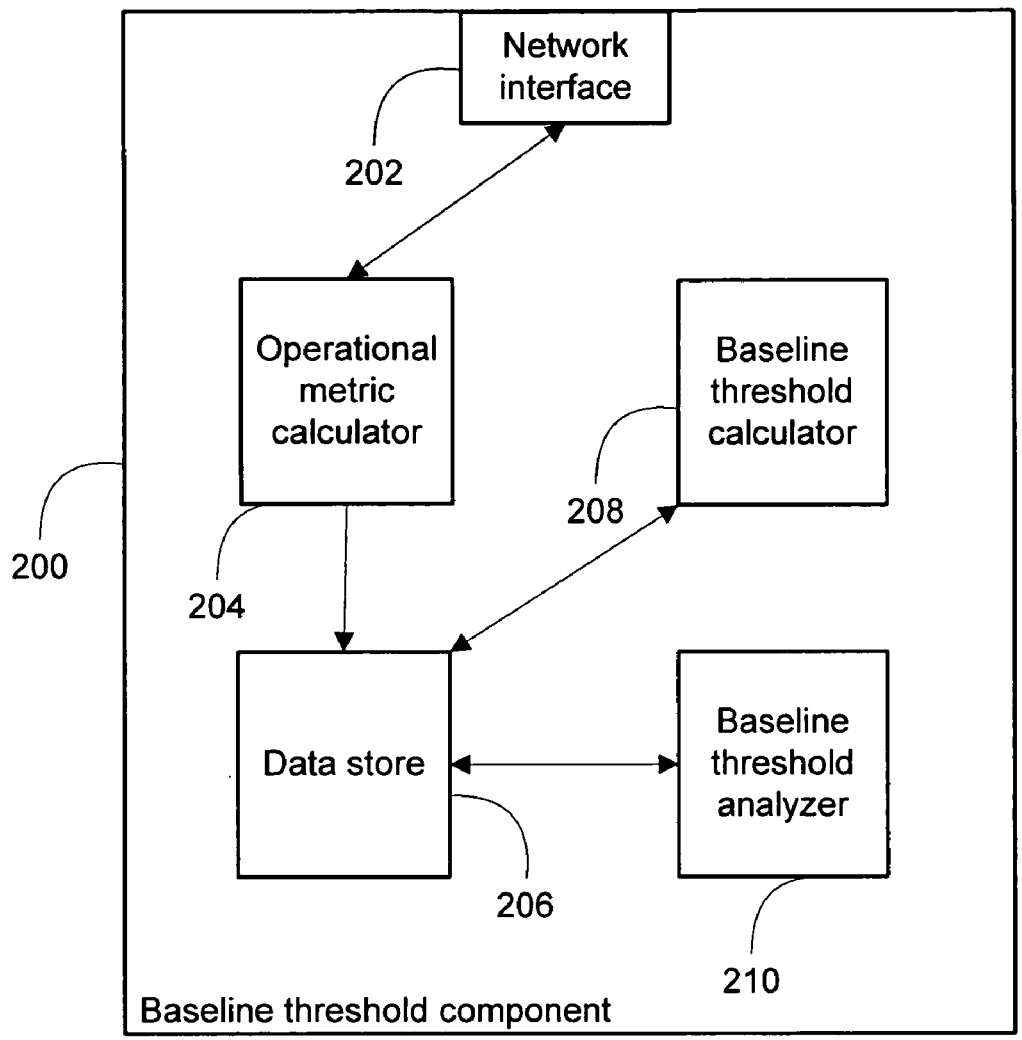
FIG. 2 is a block diagram illustrating the components of a baseline threshold monitoring system according to one embodiment of the present invention.

One embodiment of the components comprising a baseline threshold component is illustrated in FIG. 2. A baseline threshold component 200 generally comprises a network interface 202, an operational metric calculator 204, a data store 206, a baseline threshold calculator 208, and a baseline threshold analyzer. The baseline threshold component 200 may be embodied in various combinations of hardware and software, and may be a standalone component or integrated as part of a larger hardware or software system. Those of skill in the art should recognize that where the baseline threshold component 200 is embodied as a hardware or software component, other processors and/or data structures (not pictured) that are standard to the operation of a hardware or software component are contemplated as being within the scope of the embodiment. It should also be noted by those of skill in the art that the embodiment of the baseline threshold component illustrated in FIG. 2 is a logical representation of the components and may be easily implements as greater or lesser number of components.

The baseline threshold component 200 includes a network interface 202 that provides a communications path to a network and other hardware and software components connected thereto and in communication therewith. According to embodiments of the invention, the network interface 202 may provide translation function to thereby allow the baseline threshold component to communicate with hardware and software components according to different formats or protocols.

The baseline threshold component 200 also comprises an operational metric calculator 204. The operational metric calculator 204 is in communication over the network with one or more hardware and/or software components. For each of the hardware and/or software components, the operational metric calculator 204 collects one or more metrics that describe the operational behavior of the hardware or software components. For example, where the software component is an FTP server, exemplary operational metrics that the operational metric calculator collects may be the number of files served by the FTP server, or the number of clients connected to the FTP server. The operational metric calculator 204 collects operational metrics and maintains the metrics in a data store 206. The data store may be structured according to one or more data storage techniques known to those of skill in the art, including, but not limited to, a flat file data store, a comma-separated value data store, a tab-delimited data store, a relational data store, an object-oriented data store, a hybrid relational-object data store, etc.

The operational metric calculator 204 may collect operational metrics according to a "granularity" value. Although the operational metric calculator 204 captures operational metrics on an ongoing basis, the capture or sampling of the operational metrics may be taken according to various frequencies, which is represented by a granularity value. According to some embodiments, the granularity may be a function of the size or available space of the data store 206. For example, the granularity value may be set to one minute, whereby the operational metric calculator 204 samples the operational metric once every minute and writes the value to the data store 206. The operational metric calculator 204 may set a different granularity to each operational metric that the operational metric calculator samples from a given hardware or software component. Alternatively, the operational metric calculator 204 may set a single granularity for the operational metrics that the operational metric calculator samples from a given hardware or software device. Similarly, the operational metric calculator 204 may set a single granularity for operational metrics that the operational metric calculator samples from hardware and software devices.

The baseline threshold component 200 also comprises a baseline threshold calculator 208, which is the component responsible for generating the baseline thresholds for the hardware and software components connected to the network. Generally, the baseline threshold calculator 208 retrieves an operational metric for a period of time from the data store 206 for a given hardware or software component and calculates a baseline threshold. The baseline threshold calculator 208 may calculate different baseline threshold types over various time windows, such as "weekday", "weekend", "end of month", "end of fiscal year", etc., for a given a given operational metric from a given hardware or software component. Alternatively, the baseline threshold calculator 208 may calculate a different baseline threshold type for the operational metric from a given hardware or software component.

Because a given hardware or software component behaves differently at different times (e.g., acceptable performance is often a function of time), different baseline thresholds may be calculated to account for these differences. For example, the baseline threshold calculator 208 may define a baseline threshold of the type "weekday" for a web server, the baseline threshold type defined as Monday 8:00 through Friday 18:00. The baseline threshold calculator 208 retrieves a given operational metric from the data store for the web server from the time period Monday 8:00 through Friday 18:00.

The baseline threshold calculator 208 retrieves one or more operational metrics from the data store 206 for a given hardware or software component over a time window that is indicated by the baseline threshold type. Based on the retrieved operational metrics, the baseline threshold calculator 208 generates a baseline threshold, which may be a data structure that contains a timestamp data and a value of an operational metric that corresponds to the timestamp data. According to one embodiment, the operational metric that corresponds to the timestamp data is calculated according to a plurality of operational metrics, e.g., the operational metric contained within the baseline threshold is a function of one or more operational metrics.

Even though a given baseline threshold may span a relatively large time window, for example, five days in the case of a "weekday" baseline threshold type, the baseline threshold calculator 208 may calculate a baseline threshold according to a granularity. The granularity may be a time value that identifies the frequency with which the baseline threshold calculator 208 retrieves operational metrics from the data store 206. For example, where the granularity is one minute, the baseline threshold calculator 208 retrieves operational metrics for a given device at minute zero, minute one, minute two, etc., which is stored as timestamp data in the baseline threshold.

Although the time window associated with a given baseline threshold may span a relatively long period of time, e.g., Monday 8:00 through Friday 18:00, it is not necessary to collect operational metrics over the entire time window to calculate the baseline threshold. The baseline threshold calculator 208 may select a sub-window within the time window and collect the operational metric according to the granularity over the sub-window. The data comprising the sub-window is then expanded or extrapolated over the entire window. For example, assuming a time window of Monday 8:00 through Friday 18:00, the baseline threshold calculator 208 may calculate a daily baseline threshold over one day, which would be a sub-window, and apply the daily baseline threshold to the entire time window.

The baseline threshold calculator 208 may perform further tuning of the baseline threshold, e.g., retrieving additional samples of the operational metric from the data store 206 over the relevant timeframe to adjust the baseline threshold accordingly. Furthermore, the baseline threshold calculator 208 may apply smoothing techniques to smooth the resultant baseline threshold, removing noise and temporary peaks in the operational metric data. Exemplary smoothing techniques include, but are not limited to, moving average smoothing, exponential moving average smoothing, Holt-Winters exponential smoothing, Binomial (Gaussian) smoothing, Savitzky-Golay (polynomial) smoothing, etc. The resultant baseline thresholds, which are the output of the baseline threshold calculator 208, are stored in the data store 206.

A baseline threshold calculator 210 applies the baseline thresholds to the operational metrics for a given hardware or software component to determine if the given component operating in a manner that signifies the existence of an unacceptable or otherwise exceptional situation, which may include operating above or below the expected behavior as indicated by the baseline threshold. The baseline threshold calculator 210 may also define a "deviation" value, which may also be set by input from a user. The deviation value may define a relative percentage deviation from the baseline threshold, which is a dynamic "envelope" around the baseline threshold outside of which behavior is deemed unacceptable or other otherwise exceptional. For example, it is possible to define a deviation from a baseline threshold indicating that a 50% deviation from the behavior represented by the baseline threshold signifies the existence of an unacceptable or otherwise exceptional situation, which may include operating above or below the expected behavior as indicated by the baseline threshold. Relative deviation from a baseline threshold provides for the definition of acceptable behavior over a large number of components without requiring the behavior or each component to be manually analyzed. Relative deviation also allows for the detection of exceptional behavior even where the overall usage of the monitored component is below its peak. The baseline threshold analyzer 210 may also employ a static deviation from the baseline threshold, which would define a static "envelope" around the baseline threshold. Operational metrics that lie above or below the static envelope may be deemed unacceptable or other otherwise exceptional.

A given baseline threshold may have one or more associated deviations. According to one embodiment, a baseline threshold uses a different deviation according to a given time, day of the week, month of the year, etc. When the given time arrives, the baseline threshold analyzer 210 applies the appropriate deviation to use in calculating whether a current operational metric is unacceptable or otherwise exceptional, which may be because the operational metric lies above or below the deviation from the baseline threshold. For example, assume that a user sets a 50% deviation for Wednesdays and a 10% deviation for Thursdays. When the baseline threshold analyzer 210 applies a baseline threshold to current operational metrics on a Wednesday, operational metrics that are 50% outside of the baseline threshold are considered significant, whereas on Thursdays, operational metrics that are 10% outside of the baseline threshold are considered significant.

The baseline threshold analyzer 210 retrieves current operational metrics for a given hardware or software component, as well as the baseline threshold for the operational metric, from the data store 206. The baseline threshold analyzer 210 performs a comparison between the expected value of the operational metric, as identified by the baseline threshold plus any deviation, and the actual value of the operational metric as sampled by the operational metric calculator 204 and stored in the data store 206. By comparing the current value of an operational metric to the expected value set in the baseline threshold, plus any deviation, the baseline threshold analyzer 210 may detect small deviations even though the operational metric has not exceeded any static threshold. Where the current value for the operational metric exceeds the baseline threshold plus any deviation, the baseline threshold analyzer 210 generates an alarm, which may be sent to a user, such as an administrator, indicating the existence of an unacceptable or otherwise exceptional situation.

Figure 3:
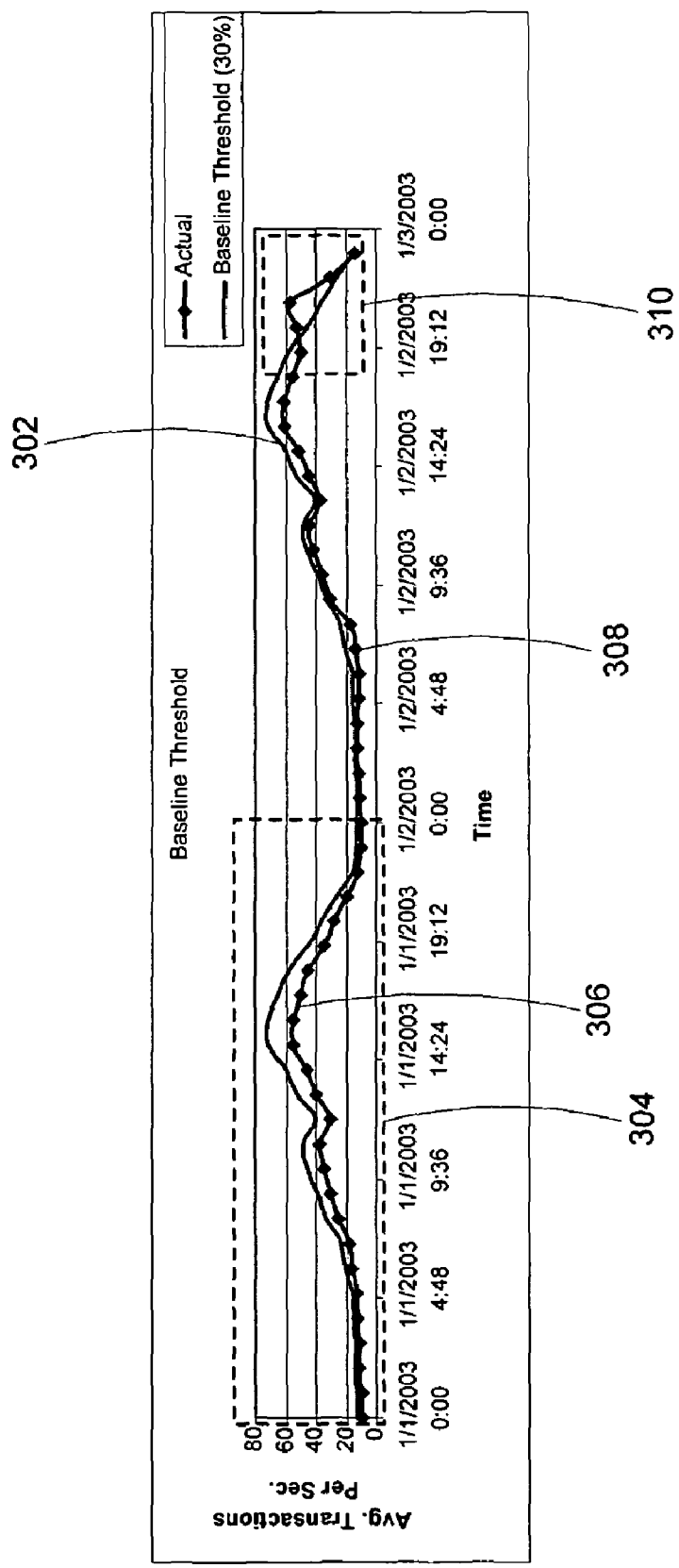
FIG. 3 is a chart illustrating the application of a baseline threshold to monitored values.

One embodiment of a graphical representation of the output of the baseline threshold component is illustrated in FIG. 3. As FIG. 3 illustrates, a baseline threshold 302 indicates the expected behavior of an operational metric of a given hardware or software component. The baseline threshold is calculated over a time window 304 based on the past observed behavior of an operational metric 306 as indicated by a plurality of samples 308 taken according to a granularity. The baseline threshold 302, which may be set to be a percentage of or a static deviation from the expected behavior, e.g., a deviation from expected behavior. By applying the baseline threshold 302 to a set of current operational metrics of a hardware or software component as a function of time (represented in the graph over the X-axis), the actual behavior of an operational metric that deviates from the expected behavior of an operational metric may be identified. From the graph of the actual behavior of an operational metric 306 plotted against a baseline threshold for the operational metric 302, a deviation in behavior is identified 310, even though the operational metric has not exceed a maximum value (represented in the graph over the Y-axis).

Figure 4:
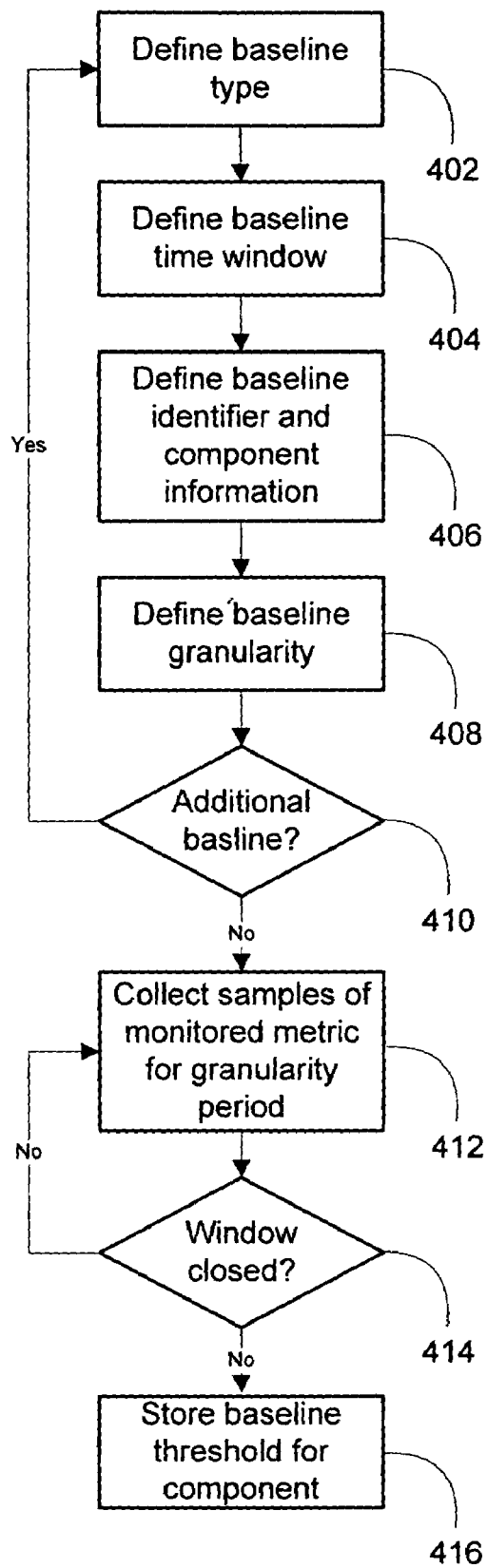
FIG. 4 is a flow diagram illustrating a method for generating a baseline threshold according to one embodiment of the present invention.

FIG. 4 presents one embodiment of a method for defining and generating a baseline threshold according to one embodiment of the present invention. The method of FIG. 4 begins with the definition of a baseline threshold type for a given baseline threshold, step 402. The method contemplates the calculation of different baseline threshold types over various time windows, such as "weekday", "weekend", "end of month", "end of fiscal year", etc., for a given a given operational metric from a given hardware or software component. Alternatively, different baseline threshold types may be calculated for the operational metrics from a given hardware or software component. A baseline threshold time window is also provided, step 404. For example, the baseline threshold may indicate that the baseline threshold is to be calculated based on one or more operational metrics of a given hardware or software component from Monday 8:00 through Friday 18:00. The window indicates the timeframe from which operational metrics are collected to calculate the baseline threshold.

A baseline threshold may also be identified by a baseline threshold identifier, as well as be associated with information regarding the component that contains the operational metric with which the baseline threshold is associated, step 406. The baseline threshold identifier may be any alphanumeric identifier or other unique identifier as is known to those of skill in the art. Component information allows the system, or a user of the system, to identify the device from which an operational metric is sampled and forms the basis of the baseline threshold. This information may be used in an alarm that signifies the existence of an unacceptable or otherwise exceptional situation, thereby allowing a user or other hardware or software components to isolate the source of a problem. A granularity value is also associated with a baseline threshold, step 408, which indicates the sample frequency of operational metrics that are used to calculate a baseline threshold.

A check is performed to determine if additional baseline thresholds are to be defined, step 410. Where additional baseline thresholds are to be defined, processing returns to step 402, where a baseline threshold type of the next baseline threshold is indicated. Where there are no additional baseline thresholds to be defined, step 410, samples of a monitored operational metric are taken every granularity period during the baseline threshold's time window, step 412. For example, where the granularity is one minute, an operational metric is sampled and recorded once every minute for the duration of the time window. A check is performed to determine if the window is closed, step 414, e.g., to determine if the time identified as the end of the window has been reached. Where the time window has not closed, step 414, processing returns to step 412, and the operational metric is sampled when the next granularity period ends. Where the window has closed, the baseline threshold is written to a data store, step 416. It should be noted by those of skill in the art that the method of FIG. 4 may be performed to generate a baseline threshold for one or more operational metrics of a given hardware or software component, or may be performed to generate a baseline threshold for one or more operational parameters of a given class of hardware or software components.

Figure 5:
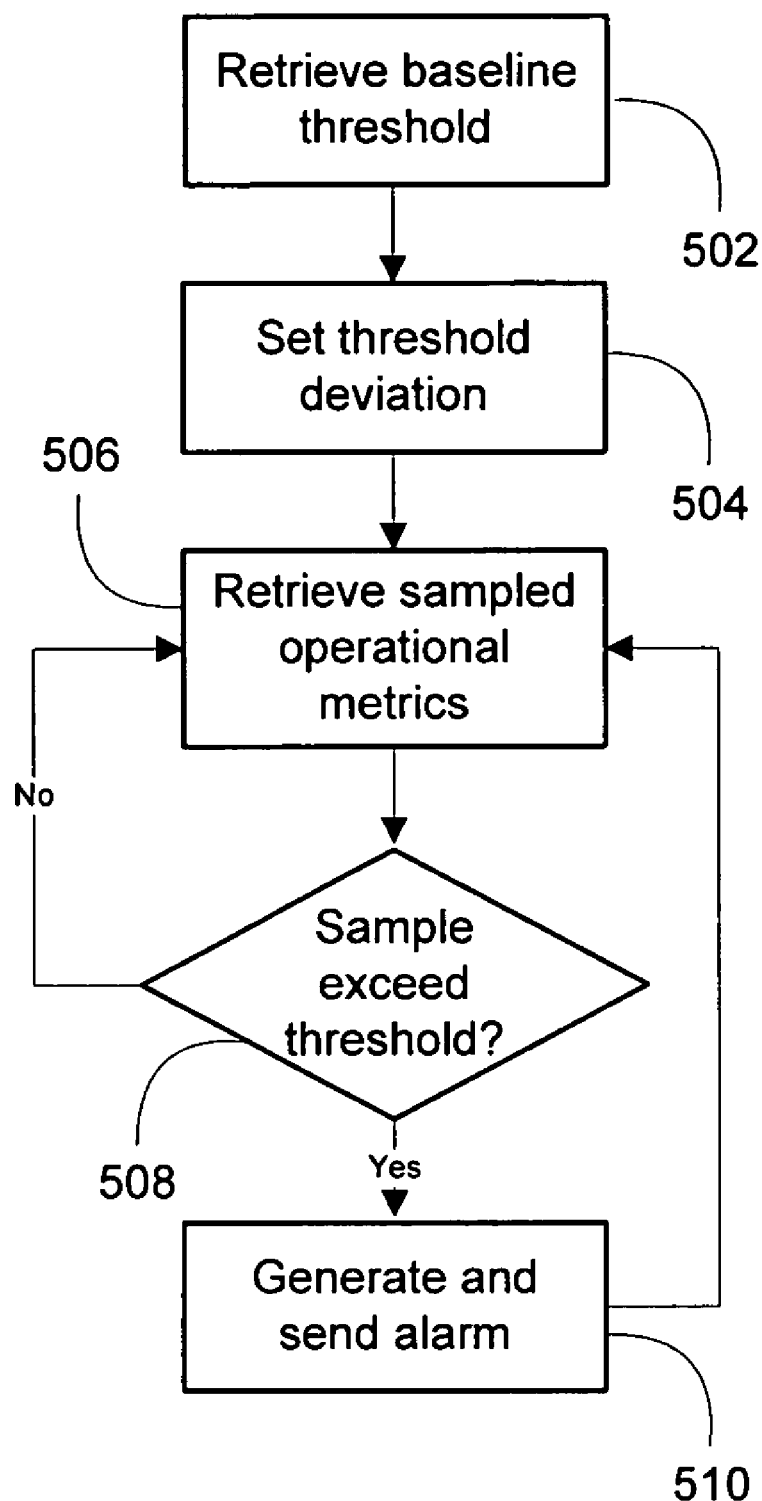
FIG. 5 is a flow diagram illustrating a method for applying a baseline threshold to sampled operational metrics according to one embodiment of the present invention.

One embodiment of a method of using a baseline threshold, such as the baseline threshold generated by the method of FIG. 4, is illustrated at FIG. 5. When the current operational metrics of a given hardware or software component are to be evaluated to determine the existence of an unacceptable or otherwise exceptional situation, a baseline threshold for the given operational metric, or for a given hardware or software component, is retrieved, step 502. A deviation value, if required, is also set for the retrieved baseline threshold, step 504. As discussed above, a baseline threshold may be associated with one or more deviations and the method may include selecting the proper deviation. Current operational metrics for a given component are retrieved, which may be operational metrics stored in a data store or operational metrics retrieved directly from a given hardware or software component for analysis, step 506.

Based on the current operational metrics for a given hardware or software component, as well as the baseline threshold for the operational metric, a comparison is performed between the expected value of the operational metric, as identified by the baseline threshold plus any deviation, and the actual value of the operational metric, step 508. Where the current operational metric exceeds the baseline threshold plus any deviation, an alarm is generated, which may be sent to a user, such as an administrator, indicating the existence of an unacceptable or otherwise exceptional situation, step 510. Where the operational metrics do not exceed the baseline threshold, processing returns to steps 506 and 508, where the current operational metrics are compared against expected values identified by the baseline threshold.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using forecasts and other analyses are disclosed herein. Except to the extent necessary or inherent in the processes themselves, no particular order to steps or stages of methods or processes described in this disclosure, including the figures, is implied.

We claim:

1. A system for identifying exceptional behavior of a hardware or software component, the system comprising:
    an operational metric calculator operative to sample a first behavior of an operational metric and a second behavior of the operational metric, wherein the operational metric quantifies a behavior of a component; wherein the sampling of the first behavior of the operational metric occurs during a time period within the time window;
    a baseline threshold calculator operative to calculate a baseline threshold, based on the sampling for the time window, wherein the baseline threshold calculator smoothes the baseline threshold to remove noise and temporary peaks in the operational metric data, for the operational metric on the basis of the first sampled behavior of the operational metric; and
    a baseline threshold analyzer operative to apply the baseline threshold for the operational metric to the second sampled behavior of the operational metric and generate an alarm when the second sampled behavior of the operational metric deviates from the baseline threshold.

2. The system of claim 1, wherein the baseline threshold calculator is further operative to generate a plurality of baseline thresholds for the operative metric in response to a plurality of samplings of the first behavior of the operative metric, wherein each baseline threshold of the plurality is associated with a different time window.

3. The system of claim 1, wherein a operational metric calculator samples behaviors of a plurality of operational metrics for a component in the system.

4. The system of claim 3, wherein the operational metric calculator samples behaviors of at least two of the operational metrics of the plurality at different granularities.

5. The system of claim 1, wherein the operational metric calculator samples behaviors of an operational metric for at least two different components.

6. The system of claim 1 wherein the sampling of the first behavior of the operational metric occurs during a time window, and is repeated for successive time periods such that first sampled behavior of the operational metric changes over time.

7. The system of claim 6 wherein the sampling of the first behavior of the operational metric occurs during a time period within the time window, and the sampling is extrapolated over the time window.

8. The system of claim 1 wherein the baseline threshold calculator tunes the sample of the first behavior of the operational metric to smooth the sample.

9. The system of claim 1 wherein the smoothing means are selected from the group consisting of moving average smoothing, exponential moving average smoothing, Holt-Winters exponential smoothing, Binomial smoothing, and Savitzky-Golay smoothing.

10. A computer executed method in which a computer system accesses instructions from a storage medium, for identifying exceptional behavior of a hardware or software component, the computer executes the instructions to perform operations for the method comprising:
    sampling a first behavior of an operational metric of a hardware or software component, wherein the operational metric quantifies a behavior of a component; wherein the sampling of the first behavior of the operational metric occurs during a time period within the time window;
    calculating a baseline threshold, based on the sampling for the time window, wherein the baseline threshold calculator smoothes the baseline threshold to remove noise and temporary peaks in the operational metric data, for the operational metric on the basis of the first sampled behavior of the operational metric;
    sampling a second behavior of the operational metric of the hardware or software component;
    applying the baseline threshold of the operational metric to the second sampled behavior of the operational metric; and
    generating an alarm when the second sampled behavior of the operational metric deviates from the baseline threshold.

11. The method of claim 10, wherein the baseline threshold calculator further generates a plurality of baseline thresholds for the operative metric in response to a plurality of samplings of the first behavior of the operative metric, wherein each baseline threshold of the plurality is associated with a different time window.

12. The method of claim 10, wherein a operational metric calculator samples behaviors of a plurality of operational metrics for a component in the system.

13. The method of claim 12, wherein the operational metric calculator samples behaviors of at least two of the operational metrics of the plurality at different granularities.

14. The method of claim 10, wherein the operational metric calculator samples behaviors of an operational metric for at least two different components.

15. The method of claim 10 wherein the sampling of the first behavior of the operational metric occurs during a time window, and is repeated for successive time periods such that first sampled behavior of the operational metric changes over time.

16. The method of claim 10 wherein the smoothing means are selected from the group consisting of moving average smoothing, exponential moving average smoothing, Holt-Winters exponential smoothing, Binomial smoothing, and Savitzky-Golay smoothing.

\* \* \* \* \*